United States Patent [19]

Norisue et al.

[11] Patent Number: 5,328,945
[45] Date of Patent: Jul. 12, 1994

[54] RESIN COMPOSITION OF POLYPHENYLENE ETHER AND POLYAMIDE

[75] Inventors: Yasumasa Norisue, Hiratsuka; Goro Shimaoka, Yokkaichi; Hideo Uno, Hiratsuka, all of Japan

[73] Assignee: Mitsubishi Gas Chemical Company, Inc., Tokyo, Japan

[21] Appl. No.: 989,827

[22] Filed: Dec. 14, 1992

[30] Foreign Application Priority Data

Dec. 17, 1991 [JP] Japan .................. 3-353226

[51] Int. Cl.$^5$ .............. C08K 5/09; C08F 283/08; C08G 63/48
[52] U.S. Cl. .................. 524/399; 524/400; 525/68; 525/92; 525/132; 525/135; 525/391; 525/397
[58] Field of Search .......... 524/399, 400; 525/391, 525/135, 132, 92, 68, 397

[56] References Cited

U.S. PATENT DOCUMENTS

| | | | |
|---|---|---|---|
| 4,315,086 | 2/1982 | Ueno et al. | 524/538 |
| 4,396,730 | 8/1983 | Imahashi | 524/400 |
| 4,873,276 | 10/1989 | Fujii et al. | 525/132 |
| 4,963,620 | 10/1990 | Grant et al. | 525/132 |
| 5,073,620 | 12/1991 | Sanada et al. | 525/132 |
| 5,084,523 | 1/1992 | Neugebauer et al. | 525/132 |
| 5,135,983 | 8/1992 | Morioka | 525/132 |
| 5,147,942 | 9/1992 | Abe et al. | 525/132 |

FOREIGN PATENT DOCUMENTS 0001245 1/1985 Japan .................. 524/400

Primary Examiner—Kriellion S. Morgan
Attorney, Agent, or Firm—Wenderoth, Lind & Ponack

[57] ABSTRACT

A polyphenylene ether/polyamide resin composition comprising:

(A) polyphenylene ether modified with an unsaturated carboxylic acid having (a) an ethylenically unsaturated double bond and (b) either a carboxyl group or an acid anhydride group, (B) 6,6-nylon, (C) 6-nylon, and optionally (D) a montanic acid metal salt.

This composition is possesses good flowability, heat resistance, solvent resistance, dimensional stability, and moreover good releasability from a mold and recyclability on the basis of advantages of polyphenylene ether (PPE) and polyamide, and can be used for manufacturing automobile parts such as wheel caps, fenders, bumpers and spoilers, or housings for office automation machines, etc.

17 Claims, No Drawings

RESIN COMPOSITION OF POLYPHENYLENE ETHER AND POLYAMIDE

DETAILED DESCRIPTION OF THE INVENTION

The present invention relates to a resin composition comprising a polyphenylene ether and a polyamide. More specifically, it relates to an industrially useful resin composition having good flowability, heat resistance, solvent resistance, dimensional stability, releasability from a mold as well as recycling capability on the basis of the advantages imparted to it by polyphenylene ether (PPE) and polyamide. The resin composition can be used for manufacturing automobile parts, such as wheel caps, fenders, bumpers and spoilers, or housings for office automation equipment.

Polyphenylene ether is a resin having excellent heat resistance, rigidity and electric properties, and is useful as an engineering plastic. Since, however, polyphenylene ether is poor in moldability, it is generally used in the form a resin composition together with polystyrene. However, it is well known that this resin composition is poor in solvent resistance, and it is very difficult to impart moldability and heat resistance to this resin composition.

It has been recently revealed that a resin composition that is superior from the standpoint of such properties as solvent resistance, moldability, heat resistance, etc., can be obtained when polyphenylene ether and polyamide which are incompatible with each other are melt-kneaded in the presence of a compatibilizing agent (see Japanese Patent Publications No. 11,966/1985 and No. 22,305/1989).

As examples of compositions containing polyphenylene ether and polyamide there may be mentioned compositions containing polyphenylene ether and 6-nylon and compositions containing polyphenylene ether and 6,6-nylon.

The composition containing polyphenylene ether and 6,6-nylon has advantages in that it has higher heat resistance and smaller water absorption than compositions containing polyphenylene ether and 6-nylon. However, a composition containing polyphenylene ether and 6,6-nylon has such defects that it is poor in moldability and exhibits a a poor weld appearance. Concerning heat resistance, a composition containing polyphenylene ether and 6,6-nylon deteriorates less under heat aging at at least 150° C. as compared with a composition containing polyphenylene ether and 6-nylon.

It is an object of the present invention to provide a novel resin composition comprising a polyphenylene ether and a polyamide.

It is another object of the present invention to provide a novel resin composition which possesses a variety of excellent advantages of a composition containing polyphenylene ether and 6,6-nylon, such as excellent flowability, heat resistance, solvent resistance and dimensional stability and which also shows excellent moldability and has a good weld appearance.

It is yet another object of the present invention to provide a resin composition which is excellent in mold release characteristics and moldability in that it shows little resistance to release from a mold and that it gives little deformation to a molded article when an article having a complicated form is molded and that its molding time is short.

It is still a further object of the present invention to provide a resin composition which is excellent in recycling capability in that it shows little or no decrease in strength when recycled to conservative resources and energy, unless it is recycled many times.

Other objects and advantages of the present invention will be apparent from the following description.

According to the present invention, the above objects and advantages of the present invention are achieved, first, by a polyphenylene ether/polyamide resin composition (hereinafter referred to as "first resin composition") comprising:

(A) polyphenylene ether modified with an unsaturated carboxylic acid having (a) an ethylenically unsaturated double bond and (b) either a carboxyl group or an acid anhydride group in the molecule,
(B) 6,6-nylon, and
(C) 6-nylon, whereas on the basis of the total amount of the components (A), (B) and (C), the amount of the component (A) is 20 to 70% by weight and the total amount of the components (B) and (C) is 30 to 80% by weight; and the amount of the component (C) is 10 to 100 parts by weight, per 100 parts by weight of the component (B).

The polyphenylene ether, before the modification, used in the present invention preferably includes polyphenylene ethers obtained by polycondensation of at least one of monocyclic phenols having the formula (1),

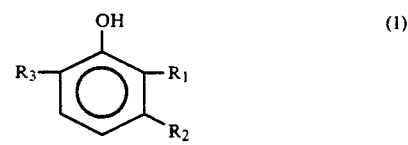

wherein $R_1$ is a lower alkyl group having 1 to 3 carbon atoms, and each of $R_2$ and $R_3$ is, independently of the other, a hydrogen atom or a how molecular weight alkyl group having 1 to 3 carbon atoms, and vinyl aromatic compound graft copolymers obtained by grafting vinyl aromatic compound(s) onto the above polyphenylene ethers.

The polyphenylene ether may be a homopolymer or copolymer. The monocyclic phenols of the above formula (1) include 2,6-dimethylphenol, 2,6-diethylphenol, 2,6-dipropylphenol, 2-methyl-6-ethylphenol, 2-methyl-6-propylphenol, 2-ethyl-6-propylphenol, o-cresol, 2,3-dimethylphenol, 2,3-diethylphenol, 2,3-dipropylphenol, 2-methyl-3-ethylphenol, 2-methyl-3-propylphenol, 2-ethyl-3-methylphenol, 2-ethyl-3-propylphenol, 2-propyl-3-methylphenol, 2-propyl-3-ethylphenol, 2,3,6-trimethylphenol, 2,3,6-triethylphenol, 2,3,6-tripropylphenol, 2,6-dimethyl-3-ethylphenol and 2,6-dimethyl-3-propylphenol.

The polyphenylene ethers obtained by the polycondensation of at least one of the above phenols include poly(2,6-dimethyl-1,4-phenylene)ether, poly(2,6-diethyl-1,4-phenylene)ether, poly(2,6-dipropyl-1,4-phenylene)ether, poly(2-methyl-6-ethyl-1,4-phenylene)ether, poly(2-methyl-6-propyl-1,4-phenylene)ether, poly(2-ethyl-6-propyl-1,4-phenylene)ether, a 2,6-dimethylphenol/2,3,6-trimethylphenol copolymer, a 2,6-dimethylphenol/2,3,6-triethylphenol copolymer, a 2,6-diethylphenol/2,3,6-trimethylphenol copolymer, a 2,6-dipropylphenol/2,3,6-trimethylphenol copolymer, a graft copolymer obtained by grafting styrene onto poly(2,6-dimethyl-1,4-phenylene)ether, and a graft copolymer obtained by grafting styrene onto 2,6-trimethylphenol.

Among the above polyphenylene ethers, particularly preferred are poly(2,6-dimethyl-1,4-phenylene)ether and a 2,6-dimethylphenol/2,3,6-trimethylphenol copolymer. The intrinsic viscosity of the polyphenylene ether, measured in chloroform at 25° C., is preferably 0.1 to 0.7 dl/g, more preferably 0.3 to 0.6 dl/g. When the intrinsic viscosity of the polyphenylene ether described above is less than 0.1 dl/g, the resultant composition is liable to be fragile. When it exceeds 0.7 dl/g, the resultant resin composition tends to show poor flowability.

The modifier used for the modification of the polyphenylene ether of the present invention is selected from unsaturated carboxylic acids having (a) an ethylenically unsaturated double bond and (b) either a carboxyl group or an acid anhydride group in the molecule.

The above unsaturated carboxylic acids preferably include α, β-unsaturated dicarboxylic acids, α, β-unsaturated monocarboxylic acids and/or anhydrides of these.

Specific examples of the α, β-unsaturated dicarboxylic acids include maleic acid, chloromaleic acid, fumaric acid, citraconic acid and itaconic acid. Specific examples of the α, β-unsaturated monocarboxylic acids include acrylic acid, butenoic acid, crotonic acid, vinylacetic acid, methacrylic acid, pentenoic acid and angelic acid. Further, anhydrides of these α, β-unsaturated dicarboxylic acids and/or α, β-unsaturated monocarboxylic acids may be used.

Among the above modifiers maleic acid, fumaric acid, acrylic acid, methacrylic acid and maleic anhydride, are preferred and maleic anhydride is particularly preferred. The above unsaturated dicarboxylic acids, unsaturated monocarboxylic acids and anhydrides thereof may be used alone or in combination.

The above modifier is used preferably in an amount of 0.01 to 10 parts by weight and more preferably 0.1 to 3 parts by weight, per 100 parts by weight of the polyphenylene ether. When the amount of the modifier is outside the above range, the compatibility between the polyphenylene ether and nylon is poor, and as a result, the resultant resin composition is undesirably fragile.

The modified polyphenylene ether (A) of the present invention can be prepared, for example, by any one of the following methods. In one method, the above polyphenylene ether and modifier are allowed to react by melt-kneading them in a roll mill, a Banbury mixer or an extruder at a temperature between 150° C. and 350° C. In another method, the polyphenylene ether and modifier are allowed to react in a solvent such as benzene, toluene or xylene. To cause the modification reaction in these methods to proceed more easily, the reaction system may contain a radical initiator selected from organic peroxides such as benzoyl peroxide, di-tert-butyl peroxide, dicumyl peroxide and tert-butylperoxybenzoate and azo compounds such as azobisisobutyronitrile and azobisisovaleronitrile.

The 6,6-nylon (B) used in the resin composition of the present invention is substantially composed of a recurring unit of the formula (2).

  (2)

The above 6,6-nylon (B) can be obtained, for example, by condensation of hexamethylenediamine having the formula of $H_2N—(CH_2)_6—NH_2$ and either adipic acid having the formula of $HOOC—(CH_2)_4—COOH$ or adipic acid ester having the formula of $ROOC—(CH_2)_4—COOR$ (in which each of Rs is methyl, ethyl or propyl), or by condensation of adipic acid and diisocyanate having the formula of $OCN—(CH_2)_6—NCO$.

The relative viscosity (ηr) of the above 6,6-nylon, measured in 98% sulfuric acid, is preferably 2.2 to 3.2 and more preferably 2.4 to 3.0. When this relative viscosity is less than 2.2, the resultant resin composition shows undesirably low strength. When the viscosity exceeds 3.2, the resultant resin composition shows undesirably poor moldability.

The 6-nylon (C) used in the resin composition of the present invention is obtained by ring-opening polymerization of ε-caprolactam and is substantially composed of a recurring unit of the formula (3).

  (3)

The relative viscosity (ηr) of the above 6-nylon, measured in 98% sulfuric acid, is preferably 2.2 to 3.2 and more preferably 2.3 to 3.0. When this relative viscosity is less than 2.2, the resultant resin composition shows undesirably low strength and low heat resistance. When the relative viscosity exceeds 3.2, the resultant resin composition shows undesirably poor moldability and the effect on the improvement of the appearance of a weld portion decreases.

The above resin composition of the present invention comprises the above components (A), (B) and (C), and these components (A), (B) and (C) are contained in the following ratios.

On the basis of the total amount of the components (A), (B) and (C), the amount of component (A) is 20 to 70% by weight, and the total combined amount of components (B) and (C) is 30 to 80% by weight. The amount of component (C) per 100 parts by weight of the component (B) is 10 to 100 parts by weight. Further, on the basis of the total amount of the components (A), (B) and (C), the amount of the component (A) is preferably 30 to 60% by weight, and the total combined amount of the components (B) and (C) is preferably 40 to 70% by weight. The amount of the component (C) per 100 parts by weight of the component (B) is preferably 20 to 80 parts by weight. This resin is called the "first resin composition" of the present invention.

When the amount of the 6-nylon used as component (C) is less than 10 parts by weight, little improvement of the moldability and weld appearance is obtained. When it is more than 100 parts by weight, the resultant resin composition shows undesirably reduced heat resistance.

The present invention further provides a resin composition which possesses smaller resistance to release from a mold and a smaller molding time than the above resin composition of the present invention.

That is, the present invention, also includes a polyphenylene ether/polyamide resin composition (hereinafter referred to as "second resin composition") comprising:

(A) polyphenylene ether modified with an unsaturated carboxylic acid having (a) ethylenically unsaturated double bond and (b) either a carboxyl group or an acid anhydride group in the molecule,
(B) 6,6-nylon, (C) 6-nylon, and
(D) montanic acid metal salt, where on the basis of the total amount of the components (A), (B) and (C), the amount of component (A) is 20 to 70% by weight and the total combined amount of components (B) and (C) is 30 to 80% by weight; the amount of component (C) per 100 parts by weight of component (B) is 10 to 100 parts by weight; and the amount of component (D) per 100 parts by weight of the total amount of the components (A), (B) and (C) is 0.1 to 3 parts by weight.

The above components (A), (B) and (C) are the same as those components which have been described for the first resin composition of the present invention.

The montanic acid metal salt used as the component (D) in the second resin composition of the present invention includes sodium montanate, potassium montanate, lithium montanate, calcium montanate, zinc montanate, barium montanate and aluminum montanate. Among these, sodium montanate is preferred in view of its overall effectiveness and industrial availability.

The second resin composition of the present invention comprises the above components (A), (B), (C) and (D), and these components are contained in the following ratios.

On the basis of the total amount of the components (A), (B) and (C), the amount of component (A) is 20 to 70% by weight and the total combined amount of components (B) and (C) is 30 to 80% by weight. The amount of component (C) per 100 parts by weight of component (B) is 10 to 100 parts by weight, and the amount of component (D) per 100 parts by weight of the total amount of the components (A), (B) and (C) is 0.1 to 3 parts by weight.

Further, on the basis of the total amount of components (A), (B) and (C), the amount of component (A) is preferably 30 to 60% by weight, and the total amount of components (B) and (C) is preferably 40 to 70% by weight. The amount of component (C) per 100 parts by weight of component (B) is preferably 20 to 80 parts by weight, and the amount of component (D) per 100 parts by weight of the total amount of components (A), (B) and (C) is preferably 0.2 to 1 part by weight. When the amount of 6-nylon as component (C) is less than 10 parts by weight, undesirably, little improvement of the moldability and weld appearance is obtained. When the amount of 6-nylon is more than 100 parts by weight, the resultant resin composition shows an undesirable decrease in heat resistance. When the amount of montanic acid metal salt used as component (D) is less than 0.1 part by weight, little improvement of the mold release characteristics is obtained. When the amount of montanic acid metal salt exceeds 3 parts by weight, the desired physical properties deteriorate.

The first and second compositions of the present invention may contain an elastomer as required, and in many cases, the incorporation of an elastomer is preferred.

The elastomer used in the present invention is an elastomer in a general sense, and the term as used here includes those defined on pages 71 to 78 of "Properties and Structures of Polymers" by A. V. Tobolsky (John Willy & Sons, Inc., 1960). That is, elastomer means polymers having a Young's modulus of 105 to 109 dynes/cm$^2$ (0.1 to 1,020 kg/cm$^2$) at room temperature.

Specific examples of the above elastomer include a styrene-butadiene random copolymer, a styrene-butadiene block copolymer, a styrene-isoprene block copolymer, a styrene-butadiene triblock copolymer in which the double bond of the polybutadiene portion is hydrogenated, a styrene-isoprene triblock copolymer in which the double bond of the polyisoprene is hydrogenated, nitrile rubber, an ethylene-propylene copolymer, an ethylene-propylene-diene copolymer (EPDM), Thiokol rubbers, polysulfide rubber, acrylic acid rubber, polyurethane rubber, a graft polymer of butyl rubber and polyethylene, polyester elastomer and polyamide elastomer.

Among the above elastomers, triblock copolymers and in particular, A-B-A' triblock copolymers are preferred. In these block copolymers, the terminal blocks, A and A', represent vinyl-containing aromatic hydrocarbon polymer blocks, and B represents a conjugated diene polymer block or a conjugated diene polymer block whose double bonds are mostly hydrogenated. The molecular weight of the B block is preferably larger than the total molecular weight of the A and A' blocks. The terminal blocks, A and A', may be the same or different, and each of these blocks is a thermoplastic homopolymer or copolymer derived from a vinyl-containing aromatic compound whose aromatic portion may be monocyclic or polycyclic.

As the vinyl-containing aromatic compound styrene, α-methylstyrene, vinyltoluene, vinylxylene, ethylvinylxylene, vinylnaphthalene or mixtures of these may be used. As the central block, B, elastomeric polymers derived from conjugated diene-containing hydrocarbons such as 1,3-butadiene, 2,3-dimethylbutadiene, isoprene, 1,3-pentadiene and mixtures of these, and elastomeric polymers whose double bonds are mostly hydrogenated may be used.

The weight average molecular weight of each of the terminal blocks, A and A', is preferably approximately 5,000 to 50,000, and the weight average molecular weight of the central block, B, is preferably approximately 25,000 to 1,500,000.

The amount of the above elastomer based on the polyphenylene ether is preferably 2 to 50% by weight, more preferably 5 to 40% by weight. When this amount is less than 2% by weight, there is obtained improvement of the impact strength. When the amount of elastomer is more than 50% by weight, the resultant resin composition shows an undesirable decrease in strength and heat resistance.

The resin compositions of the present invention may further contain other resins, a variety of additives such as a flame retardant, a flame retardant aid, a stabilizer, an ultraviolet light absorber, a plasticizer or a lubricant, a pigment, a filler or other component as required, The above "other" resins include polystyrene-containing resins, epoxy resins, polycarbonate resin, polyester resin, polysulfones and polyphenylene sulfides.

The first and second resin compositions of the present invention can be produced by melt-mixing the above essential components and the above optional components. The temperature at which the above melt-mixing is carried out is preferably between 230° C. and 340° C. and more preferably between 250° C. and 320° C. The melt-mixing is carried out with either an extruder, a kneader, a Banbury mixer or a roll.

The first and second resin compositions of the present invention possess heat resistance, water absorption properties and heat aging properties equivalent to those of a resin composition of polyphenylene ether and 6,6-nylon and moldability, weld appearance and strength equivalent to those of a resin composition of polyphenylene ether and 6-nylon. Further, the second resin composition of the present invention exhibits excellent releasability from the mold and excellent recycling capability.

The polyphenylene ether-containing resin compositions of the present invention will be described in further detail by reference to the Referential Example, Examples and Comparative Examples.

REFERENTIAL EXAMPLE 1

450 Grams of a hydrogenated styrene-butadiene-styrene type elastomer (Kraton G1651, supplied by Shell Chemical Co.) and 24 g of maleic anhydride were added to 3 kg of a 2,6-dimethylphenol polymer having an intrinsic viscosity, measured in chloroform at 25° C., of 0.47 (dl/g), and these components were mixed with a Henschel mixer. The resultant mixture was melt-kneaded in a twin-screw extruder at a temperature of 300° to 320° C., and pelletized to give maleic anhydride-modified polyphenylene ether.

EXAMPLE 1

40 Parts by weight of the pellets of the maleic anhydride-modified polyphenylene ether obtained in Referential Example 1, 40 parts by weight of 6,6-nylon (Amilan CM-3007-N with a relative viscosity in 98% sulfuric acid of $\eta_r=2.70$, supplied by Toray Industries, Inc.) and 20 parts by weight of 6-nylon (Amilan CM-1017 with a relative viscosity in 98% sulfuric acid of $\eta_r=2.65$, supplied by Toray Industries, Inc.) were mixed, and the resultant mixture was melt-kneaded and pelletized with a twin-screw extruder at 240° to 300° C. to obtain pellets. The pellets were injection-molded to obtain ⅛ inch thick dumbbell test pieces for tensile test and dumbbell test pieces having the same thickness and a weld portion (hereinafter referred to as "weld dumbbell"). These test pieces were measured for tensile strength, elongation and the depth of the welded portion. Further, the dumbbell test pieces were subjected to heat aging testing at 120° C. and 160° C., and then measured for tensile strength and elongation. The results are shown in Tables 1 and 2.

COMPARATIVE EXAMPLE 1

40 Parts by weight of the pellets of the maleic anhydride-modified polyphenylene ether obtained in Referential Example 1 and 60 parts by weight of 6,6-nylon (Amilan CM-3007-N, supplied by Toray Industries, Inc.) were mixed, and the resultant mixture was melt-kneaded and pelletized with a twin-screw extruder at 240° to 300° C. The pellets were injection-molded to prepare test pieces in the same manner as in Example 1, and the physical properties the test pieces were measured in the same manner as in Example 1. The results are shown in Tables 1 and 2.

COMPARATIVE EXAMPLE 2

40 Parts by weight of the pellets of the maleic anhydride-modified polyphenylene ether obtained in Referential Example 1, 20 parts by weight of 6,6-nylon (Amilan CM-3007-N, supplied by Toray Industries, Inc.) and 40 parts by weight of 6-nylon (Amilan CM-1017, supplied by Toray Industries, Inc.) were mixed, and the resultant mixture was melt-kneaded and pelletized with a twin-screw extruder at 240° to 300° C. The pellets were injection-molded to prepare test pieces in the same manner as in Example 1, and the physical properties the test pieces were measured in the same manner as in Example 1. The results are shown in Tables 1 and 2.

COMPARATIVE EXAMPLE 3

40 Parts by weight of the pellets of the maleic anhydride-modified polyphenylene ether obtained in Referential Example 1, 57 parts by weight of 6,6-nylon (Amilan CM-3007-N, supplied by Toray Industries, Inc.) and 3 parts by weight of 6-nylon (Amilan CM-1017, supplied by Toray Industries, Inc.) were mixed, and the resultant mixture was melt-kneaded and pelletized with a twin-screw extruder at 240° to 300° C. The pellets were injection-molded to prepare test pieces in the same manner as in Example 1, and the physical properties the test pieces were measured in the same manner as in Example 1. The results are shown in Tables 1 and 3.

EXAMPLE 2

40 Parts by weight of the pellets of the maleic anhydride-modified polyphenylene ether obtained in Referential Example 1, 45 parts by weight of 6,6-nylon (Amilan CM-3007-N, supplied by Toray Industries, Inc.) and 15 parts by weight of 6-nylon (Amilan CM-1017, supplied by Toray Industries, Inc.) were mixed, and the resultant mixture was melt-kneaded and pelletized with a twin-screw extruder at 240° to 300° C. The pellets were injection-molded to prepare test pieces in the same manner as in Example 1, and the physical properties the test pieces were measured in the same manner as in Example 1. The results are shown in Tables 1 and 3.

EXAMPLE 3

40 Parts by weight of the pellets of the maleic anhydride-modified polyphenylene ether obtained in Referential Example 1, 35 parts by weight of 6,6-nylon (Amilan CM-3007-N, supplied by Toray Industries, Inc.) and 25 parts by weight of 6-nylon (Amilan CM-1017, supplied by Toray Industries, Inc.) were mixed, and the resultant mixture was melt-kneaded and pelletized with a twin-screw extruder at 240° to 300° C. The pellets were injection-molded to prepare test pieces in the same manner as in Example 1, and the physical properties the test pieces were measured in the same manner as in Example 1. The results are shown in Tables 1 and 3.

TABLE 1

|  | Ex. 1 | Comp. Ex. 1 | Comp. Ex. 2 | Comp. Ex. 3 | Ex. 2 | Ex. 3 |
| --- | --- | --- | --- | --- | --- | --- |
| PPE from Referential Example 1 | 40 | 40 | 40 | 40 | 40 | 40 |
| 6,6-Nylon | 40 | 60 | 20 | 57 | 45 | 35 |
| 6-Nylon | 20 | 0 | 40 | 3 | 15 | 25 |
| Tensile yield strength (kgf/cm$^2$) | 640 | 660 | 600 | 660 | 650 | 630 |
| Breaking extension (%) | 110 | 90 | 150 | 100 | 110 | 120 |
| WELD DUMBBELL | | | | | | |
| Tensile yield strength (kgf/cm$^2$) | 640 | 650 | 600 | 650 | 650 | 630 |
| Breaking extension (%) | 110 | 40 | 150 | 50 | 90 | 120 |
| Depth of weld portion (μm) | 1.90 | 7.90 | 1.60 | 7.50 | 4.90 | 1.80 |

TABLE 2

| | | | Aging Time (hr) | | | | |
|---|---|---|---|---|---|---|---|
| | | | 0 | 50 | 100 | 200 | 500 |
| Ex. 1 | 120° C. | Tensile yield strength (kgf/cm$^2$) | 640 | 640 | 660 | 650 | 650 |
| | | Breaking extension (%) | 110 | 110 | 110 | 90 | 90 |
| | 160° C. | Tensile yield strength (kgf/cm$^2$) | 640 | 640 | 660 | 650 | 500 |
| | | Breaking extension (%) | 110 | 90 | 60 | 20 | 5 |
| Comp. Ex. 1 | 120° C. | Tensile yield strength (kgf/cm$^2$) | 660 | 660 | 680 | 680 | 690 |
| | | Breaking extension (%) | 90 | 90 | 90 | 80 | 70 |
| | 160° C. | Tensile yield strength (kgf/cm$^2$) | 660 | 670 | 680 | 670 | 600 |
| | | Breaking extension (%) | 90 | 70 | 30 | 10 | 5 |
| Comp. Ex. 2 | 120° C. | Tensile yield strength (kgf/cm$^2$) | 600 | 600 | 610 | 610 | 620 |
| | | Breaking extension (%) | 150 | 150 | 150 | 120 | 60 |
| | 160° C. | Tensile yield strength (kgf/cm$^2$) | 600 | 600 | 620 | 550 | 440 |
| | | Breaking extension (%) | 150 | 60 | 10 | 5 | 3 |

TABLE 3

| | | | Aging Time (hr) | | | | |
|---|---|---|---|---|---|---|---|
| | | | 0 | 50 | 100 | 200 | 500 |
| Comp. Ex. 3 | 120° C. | Tensile yield strength (kgf/cm$^2$) | 660 | 660 | 680 | 680 | 690 |
| | | Breaking extension (%) | 100 | 100 | 100 | 90 | 90 |
| | 160° C. | Tensile yield strength (kgf/cm$^2$) | 660 | 670 | 680 | 670 | 600 |
| | | Breaking extension (%) | 100 | 80 | 40 | 10 | 5 |
| Ex. 2 | 120° C. | Tensile yield strength (kgf/cm$^2$) | 650 | 650 | 660 | 650 | 650 |
| | | Breaking extension (%) | 110 | 110 | 110 | 90 | 90 |
| | 160° C. | Tensile yield strength (kgf/cm$^2$) | 650 | 650 | 660 | 650 | 500 |
| | | Breaking extension (%) | 110 | 90 | 60 | 20 | 5 |
| Ex. 3 | 120° C. | Tensile yield strength (kgf/cm$^2$) | 630 | 630 | 650 | 640 | 640 |
| | | Breaking extension (%) | 120 | 120 | 120 | 100 | 90 |
| | 160° C. | Tensile yield strength (kgf/cm$^2$) | 630 | 630 | 650 | 600 | 470 |
| | | Breaking extension (%) | 120 | 80 | 40 | 10 | 5 |

EXAMPLES 4-9

40 Parts by weight of the pellets of the maleic anhydride-modified polyphenylene ether obtained in Referential Example 1, 40 parts by weight of 6,6-nylon (Amilan CM-3007-N, a relative viscosity in 98% sulfuric acid $\eta_r=2.70$, supplied by Toray Industries, Inc.), 20 parts by weight of 6-nylon (Amilan CM-1017 with a relative viscosity in 98% sulfuric acid of $\eta_r=2.65$, supplied by Toray Industries, Inc.) and an additive shown in Table 4 were mixed, and the resultant mixture was melt-kneaded and pelletized with a twin-screw extruder at 240° to 300° C.

The above-obtained pellets were injection-molded to prepare test pieces, and the physical properties the test pieces were evaluated. Further, the above pellets were molded into box-shaped articles and measured for releasability from a mold. Furthermore, the above pellets were tested for recyclability. The molding conditions and test conditions were as follows.

(1) Test pieces: The pellets were injection-molded at a cylinder temperature of 280° C. and a mold temperature of 80° C. to obtain ⅛ inch thick dumbbell test pieces for tensile test and dumbbell test pieces having the same thickness and a weld portion.

(2) Releasability from a mold: Box-shaped articles were molded at a cylinder temperature of 280° C. and a mold temperature of 80° C., and the resistance of the articles to being pushed out of the mold was measured.

(3) Recycling capability: Dumbbell pieces having a thickness of ⅛ inch were molded at a cylinder temperature of 280° C. and a mold temperature of 80° C. The molded articles were crushed, and again injection-molded under the same conditions to prepare dumbbell pieces having the same thickness. These procedures were taken as one cycle, and this cycle was repeated 10 times.

Tables 4, Table 5 (Example 6 and Comparative Examples 5 and 6) and Table 6 (Example 6) show the results. In Table 6, "Heat resistance tensile strength" and "Heat resistance breaking extension" respectively refer to "tensile strength" and "breaking extension" after the test pieces were heat-treated at 160° C. for 100 hours.

TABLE 4

| | Additive | Amount (part by weight) | Tensile strength (kg/cm$^2$) | Breaking extension (%) | Resistance to release from mold (kg) |
|---|---|---|---|---|---|
| Ex. 4 | Na montanate | 0.1 | 630 | 110 | 80 |
| Ex. 5 | Na montanate | 0.2 | 625 | 105 | 63 |
| Ex. 6 | Na montanate | 0.5 | 620 | 105 | 52 |
| Ex. 7 | Na montanate | 3.0 | 590 | 90 | 45 |
| Comp. Ex. 4 | Na montanate | 5.0 | 500 | 50 | 43 |

TABLE 4-continued

|   | Additive | Amount (part by weight) | Tensile strength (kg/cm²) | Breaking extension (%) | Resistance to release from mold (kg) |
|---|---|---|---|---|---|
| Ex. 8 | Ca montanate | 0.2 | 630 | 104 | 65 |
| Ex. 9 | Zn montanate | 0.2 | 620 | 107 | 70 |
| Comp. Ex. 5 | Na phosphate | 0.5 | 610 | 100 | 60 |
| Comp. Ex. 6 | Ca stearate | 0.5 | 625 | 105 | 55 |
| Comp. Ex. 7 | Hoechst Wax E | 0.2 | 600 | 110 | 86 |
| Comp. Ex. 8 | IR1425WL | 0.2 | 605 | 105 | 90 |

TABLE 5

| | Test on 100% recycle test | | | | | |
|---|---|---|---|---|---|---|
| | Example 6 | | Comp. Ex. 5 | | Comp. Ex. 6 | |
| | Tensile strength (kg/cm²) | Breaking extension (%) | Tensile strength (kg/cm²) | Breaking extension (%) | Tensile strength (kg/cm²) | Breaking extension (%) |
| 0 recycle | 620 | 105 | 610 | 100 | 625 | 105 |
| 1st recycle | 620 | 103 | 600 | 98 | 620 | 103 |
| 2nd recycle | 620 | 102 | 600 | 98 | 615 | 100 |
| 3rd recycle | 615 | 102 | 590 | 95 | 610 | 98 |
| 4th recycle | 615 | 100 | 580 | 93 | 590 | 95 |
| 5th recycle | 600 | 98 | 570 | 90 | 570 | 92 |
| 6th recycle | 600 | 96 | 550 | 85 | 550 | 87 |
| 7th recycle | 595 | 95 | 505 | 70 | 530 | 80 |
| 8th recycle | 580 | 93 | 480 | 55 | 500 | 70 |
| 9th recycle | 585 | 92 | 450 | 53 | 450 | 65 |
| 10th recycle | 585 | 90 | 400 | 50 | 420 | 55 |

COMPARATIVE EXAMPLE 9

40 Parts by weight of the pellets of the maleic anhydride-modified polyphenylene ether obtained in Referential Example 1, 60 parts by weight of 6,6-nylon (Amilan CM-3007-N, supplied by Toray Industries, Inc.) and 0.5 part by weight of sodium montanate were mixed, and the resultant mixture was melt-kneaded and pelletized with a twin-screw extruder at 240° to 300° C. The pellets were injection-molded to prepare test pieces in the same manner as in Example 1, and the physical properties of the test pieces were measured in the same manner as in Example 1. The results are shown in Table 6.

COMPARATIVE EXAMPLE 10

40 Parts by weight of the pellets of the maleic anhydride-modified polyphenylene ether obtained in Referential Example 1, 20 parts by weight of 6,6-nylon (Amilan CM-3007-N, supplied by Toray Industries, Inc.), 40 parts by weight of 6-nylon (Amilan CM-1017, supplied by Toray Industries, Inc.) and 0.5 part by weight of sodium montanate were mixed, and the resultant mixture was melt-kneaded and pelletized with a twin-screw extruder at 240° to 300° C. to obtain pellets. The pellets were injection-molded to prepare test pieces in the same manner as in Example 1, and the test pieces were measured for their physical properties in the same manner as in Example 1. Table 6 shows the results.

COMPARATIVE EXAMPLE 11

40 Parts by weight of the pellets of the maleic anhydride-modified polyphenylene ether obtained in Referential Example 1, 57 parts by weight of 6,6-nylon (Amilan CM-3007-N, supplied by Toray Industries, Inc.), 3 parts by weight of 6-nylon (Amilan CM-1017, supplied by Toray Industries, Inc.) and 0.5 part by weight of sodium montanate were mixed, and the resultant mixture was melt-kneaded and pelletized with a twin-screw extruder at 240° to 300° C. The pellets were injection-molded to prepare test pieces in the same manner as in Example 1, and the physical properties of the test pieces were measured in the same manner as in Example 1. The results are shown in Table 6.

EXAMPLE 10

40 Parts by weight of the pellets of the maleic anhydride-modified polyphenylene ether obtained in Referential Example 1, 45 parts by weight of 6,6-nylon (Amilan CM-3007-N, supplied by Toray Industries, Inc.), 15 parts by weight of 6-nylon (Amilan CM-1017, supplied by Toray Industries, Inc.) and 0.5 part by weight of sodium montanate were mixed, and the resultant mixture was melt-kneaded and pelletized with a twin-screw extruder at 240° to 300° C. The pellets were injection-molded to prepare test pieces in the same manner as in Example 1, and the physical properties of the test pieces were measured in the same manner as in Example 1. The results are shown in Table 6.

EXAMPLE 11

40 Parts by weight of the pellets of the maleic anhydride-modified polyphenylene ether obtained in Referential Example 1, 35 parts by weight of 6,6-nylon (Amilan CM-3007-N, supplied by Toray Industries, Inc.), 25 parts by weight of 6-nylon (Amilan CM-1017, supplied by Toray Industries, Inc.) and 0.5 part by weight of sodium montanate were mixed, and the resultant mixture was melt-kneaded and pelletized with a twin-screw extruder at 240° to 300° C. The pellets were injection-molded to prepare test pieces in the same manner as in Example 1, and the physical properties of the test pieces were measured in the same manner as in Example 1. The results are shown in Table 6.

TABLE 6

| | Ex. 6 | Comp. Ex. 9 | Comp. Ex. 10 | Comp. Ex. 11 | Ex. 10 | Ex. 11 |
|---|---|---|---|---|---|---|
| PPE from Referential Example 1 | 40 | 40 | 40 | 40 | 40 | 40 |
| 6,6-Nylon | 40 | 60 | 20 | 57 | 45 | 35 |
| 6-Nylon | 20 | 0 | 40 | 3 | 15 | 25 |
| Na montanate | 0.5 | 0.5 | 0.5 | 0.5 | 0.5 | 0.5 |
| Tensile yield strength (kg/cm²) | 620 | 650 | 590 | 640 | 635 | 625 |
| Breaking extension (%) | 105 | 85 | 135 | 100 | 105 | 110 |

TABLE 6-continued

| | Ex. 6 | Comp. Ex. 9 | Comp. Ex. 10 | Comp. Ex. 11 | Ex. 10 | Ex. 11 |
|---|---|---|---|---|---|---|
| Weld tensile strength (kg/cm$^2$) | 615 | 640 | 585 | 630 | 630 | 620 |
| Weld breaking extension (%) | 105 | 40 | 130 | 40 | 95 | 105 |
| Resistance to release from mold (kg) | 52 | 55 | 53 | 57 | 57 | 55 |
| Heat resistance tensile strength (kg/cm$^2$) | 640 | 670 | 605 | 660 | 650 | 630 |
| Heat resistance breaking strength (%) | 65 | 20 | 10 | 30 | 60 | 50 |

What is claimed is:

1. A polyphenylene ether/polyamide resin composition comprising:
 (A) polyphenylene ether modified with an unsaturated carboxylic acid having (a) an ethylenically unsaturated double bond and (b) either a carboxyl group or an acid anhydride group in the molecule,
 (B) 6,6-nylon, and
 (C) 6-nylon,
whereas on the basis of a total amount of the components (A), (B) and (C), the amount of the component (A) is 20 to 70% by weight; the total amount of the components (B) and (C) is 30 to 80% by weight; and the amount of the component (C) per 100 parts by weight of the component (B) is 10 to 100 parts by weight, and wherein the 6-nylon as used in component (C) has a relative viscosity ($\eta_r$) in the range of from 2.2 to 3.0.

2. A resin composition according to claim 1, wherein the polyphenylene ether of component (A) is a polyphenylene ether obtained by polycondensation of at least one monocyclic phenol having the formula (1),

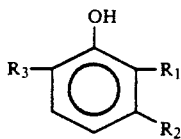

(1)

wherein $R_1$ is a lower molecular weight alkyl group having 1 to 3 carbon atoms, and each of $R_2$ and $R_3$ is, independently of the other, a hydrogen atom or a lower molecular weight alkyl group having 1 to 3 carbon atoms,
or a vinyl aromatic compound graft copolymer obtained by grafting a vinyl aromatic compound onto the above polyphenylene ether.

3. A resin composition according to claim 1, wherein the unsaturated carboxylic acid in component (A) is an α, β-unsaturated dicarboxylic acid an, α, β-unsaturated monocarboxylic acid or an anhydride of either of these.

4. A resin composition according to claim 1, wherein the polyphenylene ether modified in component (A) is a polyphenylene ether modified with 0.01 to 10 parts by weight of an unsaturated carboxylic acid per 100 parts by weight of the polyphenylene ether.

5. A resin composition according to claim 1, wherein the 6,6-nylon used as component (B) has a relative viscosity ($\eta_r$) in the range of from 2.2 to 3.2.

6. A resin composition according to claim 1, wherein the 6-nylon used as component (C) has a relative viscosity ($\eta_r$) in the range of from 2.3 to 3.0.

7. A resin composition according to claim 1, wherein on the basis of a total amount of components (A), (B) and (C), the amount of component (A) is 30 to 60% by weight; the total amount of components (B) and (C) is 40 to 70% by weight; and the amount of component (C) per 100 parts by weight of component (B) is 20 to 80 parts by weight.

8. A resin composition according to claim 1, which further contains an elastomer component in addition to the components (A), (B) and (C).

9. A polyphenylene ether/polyamide resin composition comprising:
 (A) polyphenylene ether modified with an unsaturated carboxylic acid having (a) an ethylenically unsaturated double bond and (b) either a carboxyl group or an acid anhydride group,
 (B) 6,6-nylon,
 (C) 6-nylon, and
 (D) a montanic acid metal salt, whereas on the basis of a total amount of the components (A), (B) and (C), the amount of component (A) is 20 to 70% by weight; the total combined amount of components (B) and (C) is 30 to 80% by weight; the amount of component (C) per 100 parts by weight of the component (B) is 10 to 100 parts by weight; and the amount of component (D) per 100 parts by weight of the total amount of components (A), (B) and (C) is 0.1 to 3 parts by weight.

10. A resin composition according to claim 9, wherein the polyphenylene ether of component (A) is a polyphenylene ether obtained by polycondensation of at least one monocyclic phenol having the formula (1),

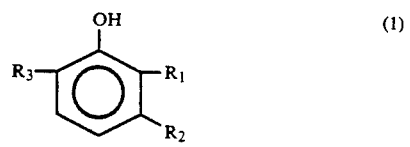

(1)

wherein $R_1$ is a lower molecular weight alkyl group having 1 to 3 carbon atoms, and each of $R_2$ and $R_3$ is, independently of the other, a hydrogen atom or a lower molecular weight alkyl group having 1 to 3 carbon atoms,
or a vinyl aromatic compound graft copolymer obtained by grafting a vinyl aromatic compound onto the above polyphenylene ether.

11. A resin composition according to claim 9, wherein the unsaturated carboxylic acid of component (A) is an α, β-unsaturated dicarboxylic acid, an α, β-unsaturated monocarboxylic acid or an anhydride of either of these.

12. A resin composition according to claim 9, wherein the polyphenylene ether modified in component (A) is a polyphenylene ether modified with 0.01 to 10 parts by weight of an unsaturated carboxylic acid per 100 parts by weight of the polyphenylene ether.

13. A resin composition according to claim 9, wherein the 6,6-nylon used as component (B) has a relative viscosity ($\eta r$) in the range of from 2.2 to 3.2.

14. A resin composition according to claim 9, wherein the 6-nylon used as component (C) has a relative viscosity ($\eta r$) in the range of from 2.2 to 3.2.

15. A resin composition of claim 9, wherein the montanic acid metal salt used as component (D) is selected from the group consisting of sodium montanate, potassium montanate, lithium montanate, calcium montanate, zinc montanate, barium montanate and aluminum montanate.

16. A resin composition according to claim 9, wherein on the basis of total amount of the components (A), (B) and (C), the amount of component (A) is 30 to 60% by weight; the total amount of components (B) and (C) is 40 to 70% by weight; the amount of component (C) per 100 parts by weight of component (B) is 20 to 80 parts by weight; and the amount of component (D) per 100 parts by weight of the total amount of components (A), (B) and (C) is 0.2 to 1 part by weight.

17. A resin composition according to claim 9, which further contains an elastomer.

* * * * *